United States Patent
Furukawa et al.

[11] Patent Number: 6,057,941
[45] Date of Patent: May 2, 2000

[54] MICROFILM READER AND CONTROL METHOD THEREFOR

[75] Inventors: Takao Furukawa, Tokyo; Michinori Hashimoto, Kanagawa, both of Japan

[73] Assignee: Fuji Photo Film Co., Ltd., Kanagawa, Japan

[21] Appl. No.: 08/667,806

[22] Filed: Jun. 20, 1996

[30] Foreign Application Priority Data

Jun. 20, 1995 [JP] Japan .................................. 7-175552

[51] Int. Cl.⁷ .............................. H04N 1/41; H04N 1/04; H04N 1/40; H04N 5/253
[52] U.S. Cl. ......................... 358/427; 358/427; 358/429; 358/487; 358/455; 358/448; 348/112
[58] Field of Search ..................... 358/427, 487, 358/429, 455, 456, 448, 462, 472; 348/112

[56] References Cited

U.S. PATENT DOCUMENTS

| | | | |
|---|---|---|---|
| 4,837,450 | 6/1989 | Satomura et al. | 358/487 |
| 5,067,020 | 11/1991 | Funston | 348/112 |
| 5,099,321 | 3/1992 | Igarashi | 358/487 |
| 5,260,810 | 11/1993 | Kanno et al. | 358/462 |
| 5,477,343 | 12/1995 | Nodelman et al. | 358/487 |
| 5,692,094 | 11/1997 | Tsukamoto | 386/128 |

*Primary Examiner*—Edward L. Coles
*Assistant Examiner*—Twyler Lamb
*Attorney, Agent, or Firm*—Sughrue, Mion, Zinn, Macpeak & Seas, PLLC

[57] ABSTRACT

A microfilm reader and a control method therefor, suitable for reduction in size and enabling high-speed reading and efficient retrieval with less wear in the moving parts. The microfilm reader for reading an image recorded on a microfilm to supply an image data of the read image to a printer, comprising: a two-dimensional area sensor for reading plural images in respective frames of the microfilm to supply a first image data; a display for displaying the images continuously or intermittently by using the first image data so that an image of a target frame can be retrieved from the microfilm; a line sensor for reading the image of the target frame specified in the retrieval operation to supply the second image data of the target frame as the image data of the read image to be printed out. A line sensor capable of high-quality reading is used for the image to be printed out, whereas a two-dimensional area sensor with no mechanical moving part and capable of high-speed reading is used for the image to be displayed for reference.

14 Claims, 6 Drawing Sheets

MICROFILM READER AND CONTROL METHOD THEREFOR

BACKGROUND OF THE INVENTION

1. Field of the Invention

The present invention relates to a microfilm reader/printer and a control method therefor, in which an image recorded on a microfilm is read by an image sensor such as CCD arrayed line sensor and the read image is displayed on a display device as well as output to a printer.

2. Related Art

There is known in the art a microfilm reader/printer, in which an enlarged image of microfilm is projected on a screen for reference. In such a microfilm reader/printer, it is known that the enlarged projection image is read by a line sensor for printing the image.

To read and print out the image photographed on the microfilm at a high density, an enlarged projection image must be read by the line sensor because not enough pixels to print out the microfilm image can be obtained in a conventional, two-dimensional area sensor. A high-density area sensor is too costly to use.

When projecting such an enlarged image on the screen, optical system and light path space need to be reserved and therefore a problem arises in that the apparatus increases in size. To overcome the problem, it may be considered that the image read by the line sensor is displayed on a display such as CRT instead of projecting the image on the screen.

Even in such a case, since the line sensor must be moved in a vertical or subsidiary scanning direction with respect to the static image, it is difficult to read the image at a high speed. In the retrieval of the target frame containing the desired image, the line sensor is also required to perform vertical scanning as the film is moved periodically, therefore, other problems arise in that such a line sensor takes time to retrieve the target frame as well as lowers mechanical durability in moving parts of the line sensor.

SUMMARY OF THE INVENTION

The present invention has been accomplished under the circumstances as aforementioned, and an object thereof is to provide a microfilm reader suitable for reduction in size and enabling high-speed image reading and efficient retrieval with less wear in the moving parts.

Another object of the present invention is to provide a control method for the microfilm reader, suitable for reduction in size and enabling high-speed reading and efficient retrieval with less wear in the moving parts.

The first object of the present invention is attained by the provision of a microfilm reader for reading an image recorded on a microfilm to supply an image data of the read image to a printer, comprising:

a) a two-dimensional area sensor for reading plural images in respective frames of the microfilm to supply a first image data;

b) a display for displaying the images continuously or intermittently by using the first image data so that an image of a target frame can be retrieved from the microfilm; and c) a line sensor for reading the image of the target frame specified in the retrieval operation to supply the second image data of the target frame as the image data of the read image to be printed out.

The second object of the present invention is attained by the provision of a control method of a microfilm reader for reading an image recorded on a microfilm to supply an image data of the read image to a printer, comprising the steps of:

a) reading plural images in respective frames of the microfilm by an area sensor to supply a first image data;

b) displaying the images on a display continuously or intermittently by using the first image data;

c) retrieving and specifying a target frame from plural frames viewed on the display;

d) reading the image of the target frame by a line sensor to output the second image data; and e) printing out the second image data as the image of the target frame.

The microfilm reader according to the present invention features a combination of image sensors; the one is a conventional line sensor required to read the images of high quality for printing, and the other is a two-dimensional area sensor with no mechanical moving part and capable of high-speed reading for display.

The pixels of the image read by the area sensor are too few for the printing image, but enough to be used as image data for display as a reference. When the reference image to be displayed is determined, on the basis of its tones, as a high contrast image such as a character image, an image processing may be performed using an unsharped mask method. In case of a low contrast image such as a photographic image, since the display can normally describe the image with gray levels of about 16 to 256, the pixels of the image may be directly output as image data for display without any image processing performed.

The line sensor reads the image for printing at a high density, whereas the area sensor reads the image to be displayed as a reference image on the display. The image data read by the line sensor and including gray-level information may be processed in accordance with information such as a gray-level distribution of the reference image, which is not printed but displayed. For example, the high contrast image such as a character image is processed using the unsharped mask method. Meanwhile, the low contrast or middle tone image such as a photograph is processed using a dither method or the like to be represented with halftone, so that a binary image can be obtained for a printer without halftone between white and black dots.

When generating a binary image of high contrast, a threshold value of gray level must be determined so that the white and black dots can be discriminated from each other. Since the line sensor of the conventional microfilm reader performs preliminary scanning to generate a reference image before an image to be printed out is read by the same line sensor, the reading operation must be performed two times, resulting in double read-time required. On the contrary, according to the present invention, an image processing is performed based on a gray-level distribution of the reference image read by the area sensor to generate the threshold value, so that such a preliminary scanning by the line sensor does not need performing.

If a printer to be used herein can represent the halftone or tone gradation of multi-valued image data in the same manner as the display, the multi-valued image data can be directly output without dither processing in the low contrast image area read by the line sensor, thereby obtaining a high-quality printing image.

BRIEF DESCRIPTION OF THE DRAWINGS

These and other objects and advantages and further description will now be discussed in connection with the drawings in which.

DETAILED DESCRIPTION OF THE PREFERRED EMBODIMENTS

Figure 1:
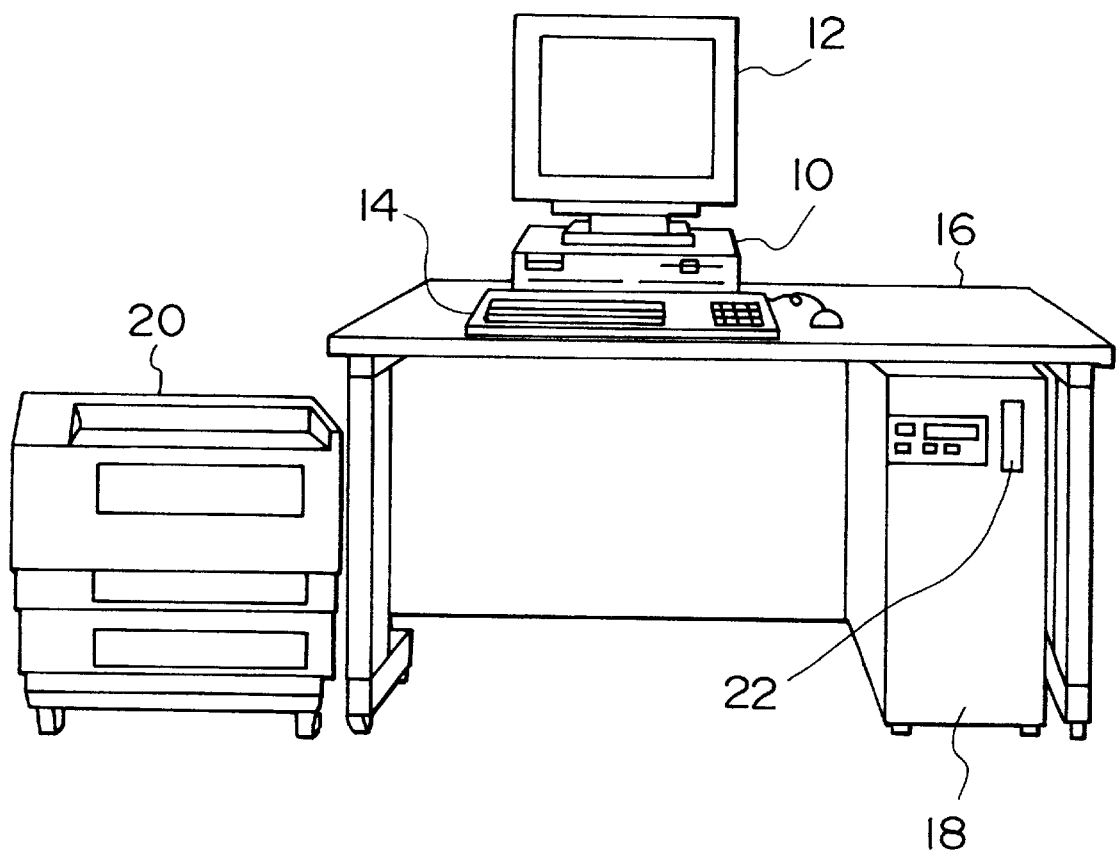
FIG. 1 is a schematic diagram showing a microfilm reader system according to an embodiment of the present invention.

Referring to FIG. 1, a reference numeral 10 denotes a computer body with built-in units such as a CPU or other processing means. A display 12 such as CRT or liquid crystal panel and a keyboard 14 are put on a desk 16. A scanner 18 and a printer 20 are located below the desktop 16 and at the side of the desk 16, respectively.

The scanner 18 has a cartridge loading port 22 on the upper portion of the front panel, and reads images recorded on a microfilm 26 contained in a cartridge 24 (see FIG. 2) which has been inserted into the cartridge loading port 22. The read image is processed in a predetermined image processing by a CPU, e.g., provided inside the scanner 18. The processed image is then displayed on the display 12 after eliminating blip marks and the black frame surrounding the image. Finally, the read image may be output to the printer 20, and either stored in a magneto-optical disk or transferred to an external processing device.

The scanner 18 has a longitudinal cabinet 28, in which a feed reel driving unit 30 and a take-up reel driving unit 32 are arranged on the upper portion of the front side in the cabinet 28 and lower front portion in the cabinet 28, respectively. When the cartridge 24 is inserted into the cartridge loading port 22, the feed reel driving unit 30 is rotated at a high speed so that the film 26 can be secured to prevent unwinding. Then, the feed reel driving unit 30 pulls out a head lead of the roll film 26 from the cartridge 24 and feeds it downwardly to guide it to a take-up reel 34 in the take-up reel driving unit 32.

Figure 2:
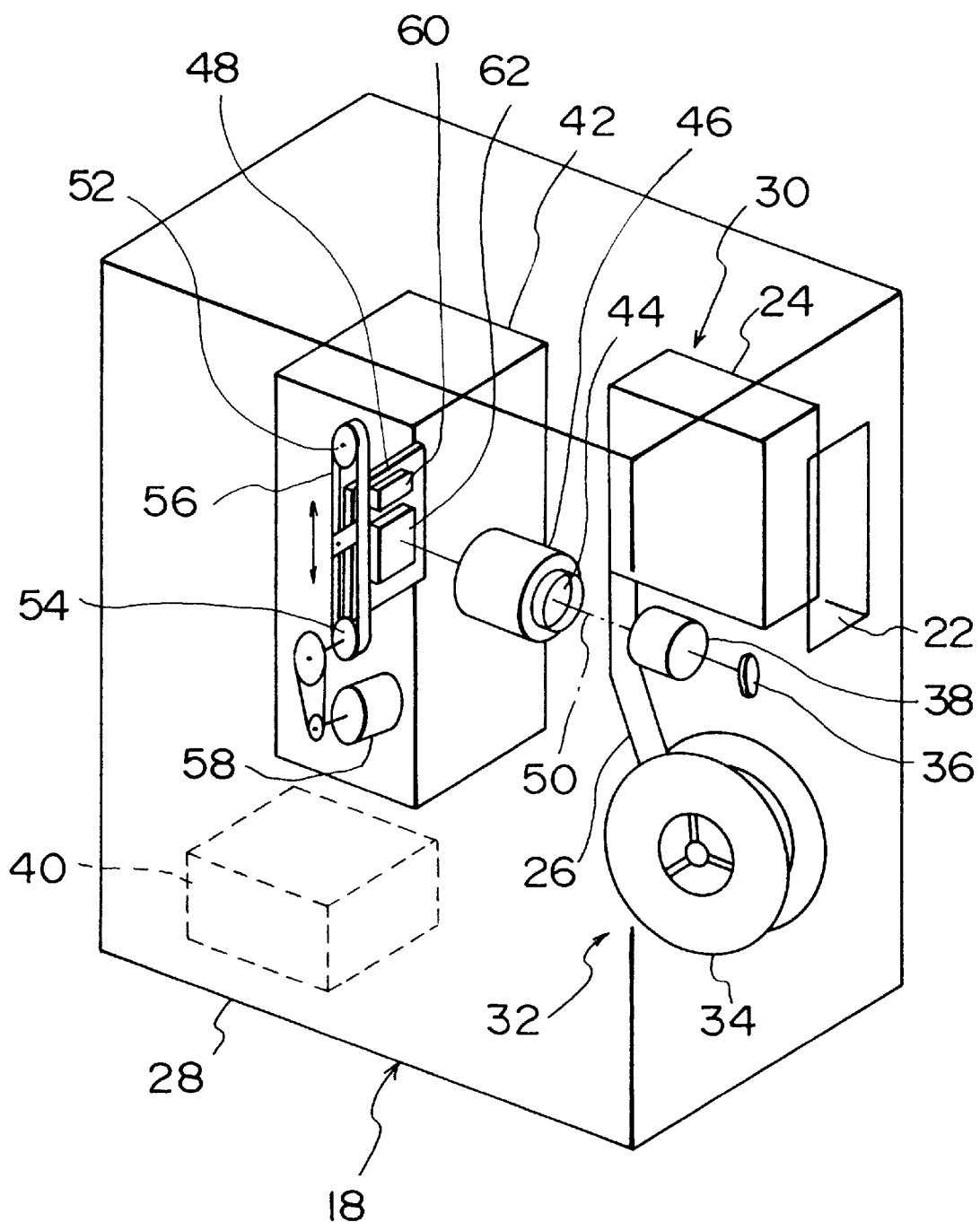
FIG. 2 is a perspective view illustrating an inner arrangement of a scanner used in the embodiment in FIG. 1.

When viewing the scanner 18 in FIG. 2, the film 26 passes through the back side of the empty space between the respective reel driving units 30, 32, that is, the film 26 passes through at the inner backside as viewed from the front of the cabinet 28, so that light source lamp 36 and condenser lens 38 can be arranged in a space formed by a gap between the reel-to-reel distance and the front panel of the cabinet 28.

The take-up reel driving unit 32 is provided with a driving belt (not shown) which travels in contact with a reel 34. The driving belt is wound on guide rollers, a drive roller, an encoder and a tension roller, and it is driven by the drive roller so that the film can be wound up.

A line sensor unit 42 will now be described. The line sensor unit 42 is integrated with a projection lens 44. More specifically, as shown in FIG. 2, a cylindrical section 46 for holding the projection lens 44 is integrally formed with the case of the line sensor unit 42. The projection lens 44 mounted in the cylindrical section 46 is a fixed focus lens with a magnifying power of approximately 2.

In the case of the line sensor unit 42, a movable plate 48 is provided on the side opposite to the cylindrical section 46.

The movable plate 48 is slidably mounted along with a pair of guide rods (not shown) fixed to the case, so that the movable plate 48 can reciprocate along a plane perpendicular to an optical axis 50 and around the opening of the cylindrical section 46.

Further, a belt 56 wound around pulleys 52, 54 is provided inside the case in a position parallel to the reciprocating direction of the movable plate 48, and one side of the movable plate 48 is fixed to the belt 56. The belt 56 is driven by a stepping motor 58 through the pulley 54. Thus, the movable plate 48 can be reciprocated on a plane perpendicular to the optical axis 50 by rotating the stepping motor 58 in a forward or reverse direction.

A longitudinal CCD arrayed line sensor 60 is fixed on the movable plate 48 in a direction perpendicular to the guide rod of the case, i.e., perpendicular to the reciprocating direction of the movable plate 48. A two-dimensional CCD arrayed area sensor 62 is also fixed on the movable plate 48 adjacent to the line sensor 60. It should be noted that the light-receiving surfaces of the CCD line sensor 60 and the CCD area sensor 62 must correspond to a plane on which a projected image from the projection lens 44 is focused.

A CCD line sensor with 7500 pixels may be used as the line sensor 60 for reading an image in a vertical or subsidiary scanning direction at a density of about 8000 pixels. In other words, the line sensor outputs an image of 60 million pixels at one-time reading. On the other hand, a CCD area sensor with 1.4 million pixels can be used as the area sensor 62.

Figure 3:
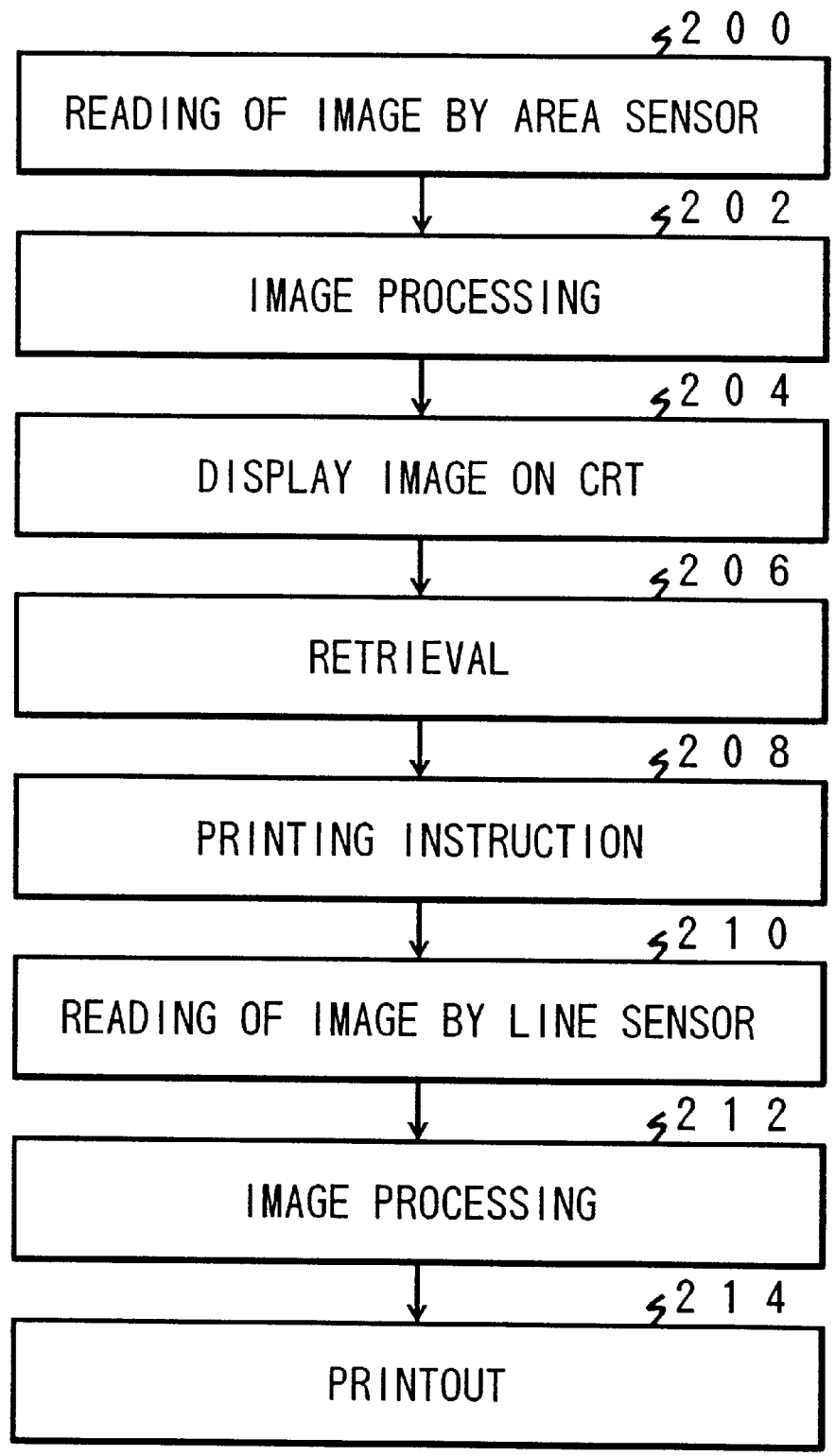
FIG. 3 is a flowchart showing an example of operation of the embodiment.

Referring next to FIG. 3, a description will be made to an example of operation procedure of the microfilm reader system. A controller 40 in the scanner 18 positions the movable plate 48 and keeps it still so that the area sensor 62 can read an image of the microfilm 26. The image incident on the area sensor 62 is read (step 200 in FIG. 3) and an image processing is performed (step 202). In other words, the controller 40 also serves as an image processor.

The image processor 40 can process the image data to fill a defect pixel (hereinbelow, referred to as a missing pixel) on the area sensor 62 in accordance with pixel information of adjacent pixels, for example, based on a mean value of gray levels among the surrounding pixels. The image processor may correct uneven output characteristics among the pixels.

The area sensor 62 thus reads the image data and sends it to the computer 10 so that the read image can be displayed on the display 12 such as CRT (step 204). Images of the microfilm 26 passing by the area sensor 62 are preferably displayed on the display 12 as a series of images, i.e., as continuous images of sequential frames on the microfilm continuously fed. Meanwhile, a static image of the not-running film 26 may be displayed as a still. In the latter case, the images in each of the frames are displayed intermittently.

The operator retrieves a target frame containing a target image from all the frames of the microfilm while watching the images on the display (step 206) and inputs a printing instruction with the keyboard 14 when the target image has been found (step 208). The target image is preferably stored in a frame memory to be left still on the display 12.

The scanner 18 stops feeding the film 26 in accordance with the printing instruction, while the controller 40 actuates the stepping motor 58 so that the line sensor 60 reads the target image (step 210). The target image data is processed by the image processing means in the controller 40 (step 212) and output to the printer 20 (step 214).

If the printer 20 used herein outputs a binary density (black and white) image, a known dither method is preferably used for adding halftones to the black and white image.

It is also preferable to perform an edge-emphasizing processing for a document image using an unsharped mask.

The printer 20 may be a printer capable of outputting a multi-valued (gray level) image, e.g., a xerographic printer which forms a latent image on a photosensitive drum using a laser beam as a light source, the light intensity of the laser beam changed continuously in multi-levels.

If such a half-tone printer is used herein, the image data read in multi-levels by the line sensor 60 can be printed out in the multi-tone gradation. In particular, this is effective for printing out low contrast (middle tone) image data faithfully and precisely, such as continuous-tone image data included in an original photograph.

The image data read by the area sensor 62 may be used to obtain the printing data. For example, the original image of the document included in the image data is discriminated from the black frame portion surrounding the original image (black area surrounding the original image existing at printing of the negative film) so that the black frame portion can be changed to be white when printed out. Further, the exposure density may be detected from the output of the area sensor 62 so that the light exposure of the light source 36 is automatically controlled (automatic exposure control).

Figure 4:
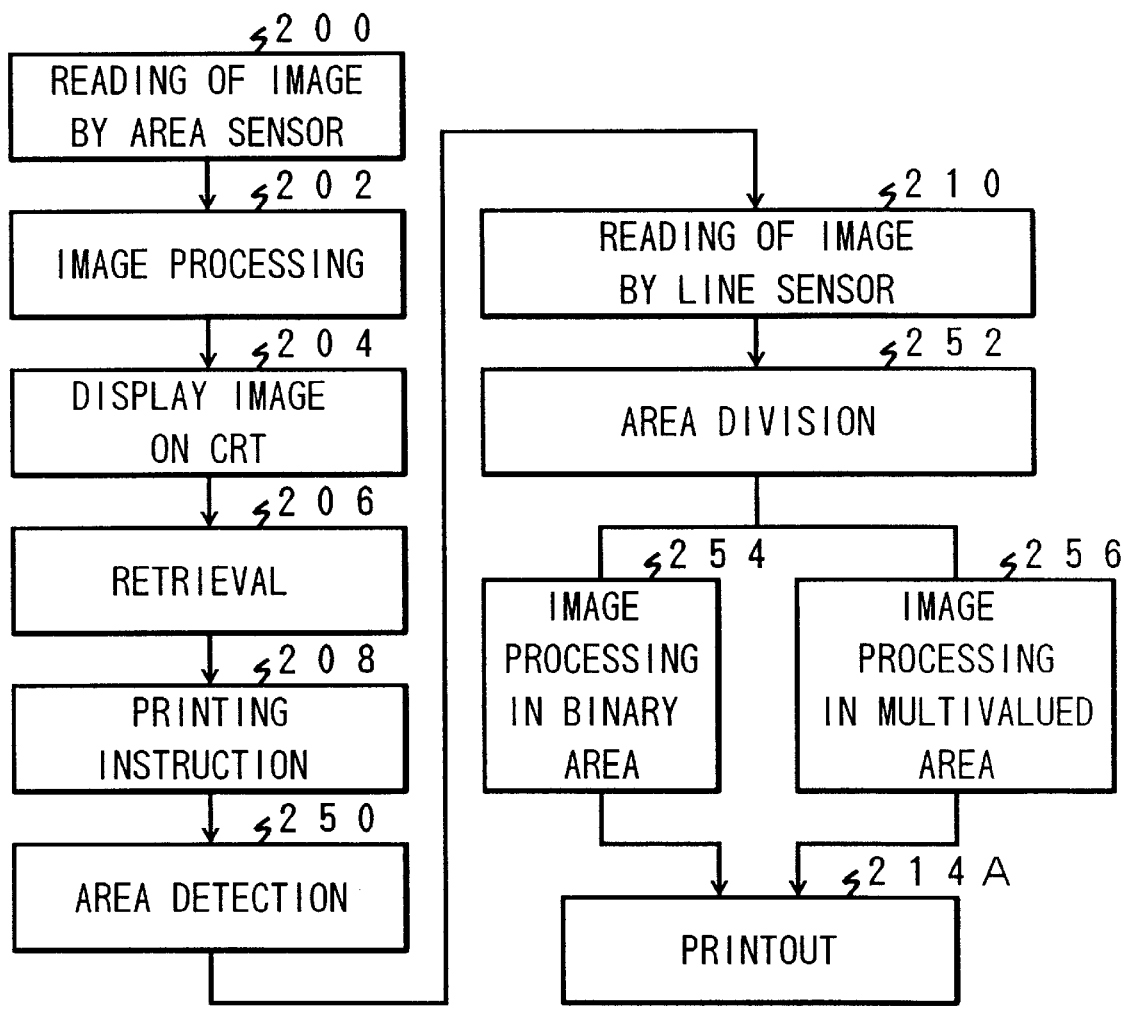
FIG. 4 is a flowchart showing another example of operation of the embodiment.

Referring next to FIG. 4, a description will be made to another example of operation procedure of the microfilm reader system. In this operational embodiment, the target image is divided into a high contrast area (binary density or gradation area, also referred as a binary area) and a low contrast area (multi-valued or multi-leveled gradation area, also referred as a multi-valued or half-tone area) in accordance with the output data of the area sensor 62, so that the target image is printed out after an individual image processing has been performed in each area. In FIG. 4, steps 200 to 208 are the same as those in FIG. 3, and the description of such steps are omitted.

When a printing instruction is input (step 208), a target image to be printed out is selected and area discrimination is made in accordance with the output data of the area sensor 62 (step 250), e.g., a binary area and a multi-valued area are discriminated depending on whether the image is a high contrast image or a low contrast image, or whether the image data includes middle tones. It should be noted that the exposure control and the black frame detection can be performed at this time.

The line sensor 60 then reads the image of the target frame at high density (step 210) so that the read image data is divided into the binary area and the multi-valued (half-tone) area discriminated at step 250 (step 252). After that, an individual image processing is performed for image data in each area (steps 254, 256), and the target image is printed out in combination (step 214A).

As to the image processings, an edge emphasizing is adapted for the binary area (step 254), whereas a multinarizing processing such as a dither processing (when the printer 20 outputs a binary image) or a gray scale transformation (when the printer 20 outputs multi-valued image) is adapted for the multi-valued (half-tone) area.

The gray scale transformation is used, for example, in a case that the original document is a map or old document, in consideration of sudden changes in gray scale on the background, for adjusting the gray scale to a proper print level. In this embodiment, an individual image processing can be performed in each of the binary area and the multi-valued (middle tone) area, thereby improving the quality of printout.

Figure 5:
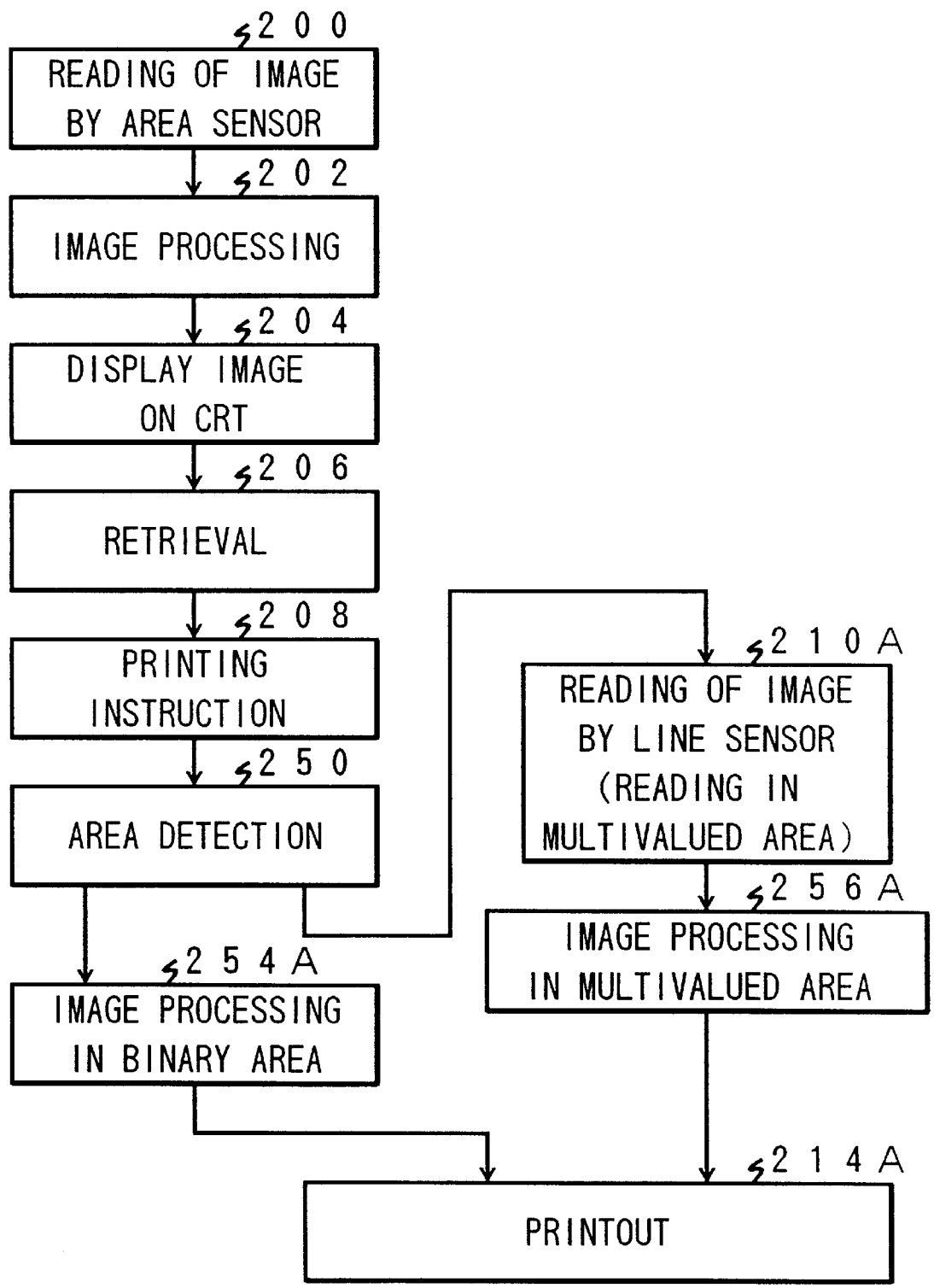
FIG. 5 is a flowchart showing still another example of operation of the embodiment.

Referring next to FIG. 5, a description will be made to still another example of operation procedure of the microfilm reader system. This embodiment is different from that in FIG. 4 in that the binary area image to be printed out is read by the area sensor 62 so that the line sensor 60 reads only the multi-valued area image for printing.

In details, after detecting areas at step 250 in the same manner as in FIG. 4, the image in the binary area which is obtained from the image data of the area sensor 62 is subjected to the binarizing image processing (step 254A), whereas the line sensor 60 reads only the image in the multi-valued area (step 210A). The image data in the multi-valued area is then processed (step 256A) and printed out in combination with the binary image data obtained at step 254A (step 214A). According to the embodiment, the image reading area of the line sensor 60 can be made narrow or small and hence the image readout-time is reduced.

Figure 6:
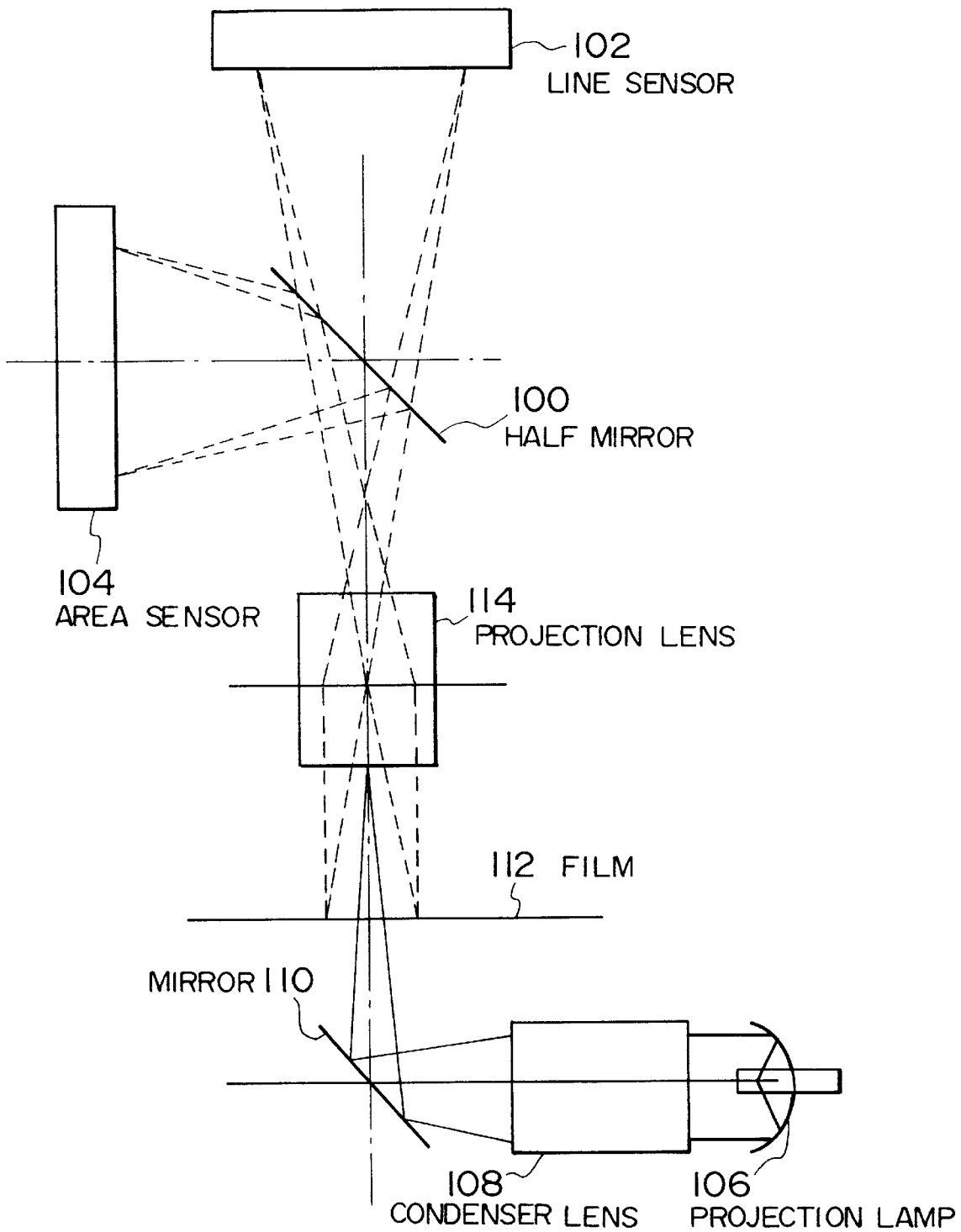
FIG. 6 is a simplified diagram showing a mechanism of a microfilm reader according to another embodiment of the present invention.

FIG. 6 is a simplified diagram showing a mechanism of a microfilm reader according to another embodiment of the present invention. In this embodiment, a film-projected image is divided by a half mirror 100 to be transmitted to a line sensor 102 and a two-dimensional area sensor 104, respectively. In FIG. 6, there are also shown a projection lamp 106, a condenser lens 108, a mirror 110, a microfilm 112 and a projection lens 114.

According to the embodiment, the area sensor 104 can read an identical image to the projected image being read by the line sensor 102. For this reason, the operator can operate the line sensor 102 to read a target image as soon as it is found while monitoring the display images read by the area sensor 104, so that the image reading operation of the line sensor can be performed more quickly than that in FIGS. 1 and 2.

As described above, according to the present invention, images read by the area sensor are displayed on a display such as CRT instead of a screen, so that the operator can retrieve a target image while monitoring the display images, thereby reducing the apparatus size.

Also, since the area sensor can read images to be displayed more quickly than the line sensor, the retrieval effectiveness can be improved. Further, the line sensor does not need to move in the vertical scanning direction at all the processing steps but only the printing step, so that the operation time can be reduced, resulting in less wear in the moving parts.

Although the images read by the area sensor may be displayed as stills, if the microfilm images are displayed as a series of dynamic images of sequential frames, a target image can be retrieved while observing the same microfilm images as projected on the screen, and this makes it easy to operate.

Furthermore, after the high contrast area and the low contrast area have been separated from each other in accordance with output data of the area sensor, if the binary (black and white) image processing and the multi-valued (gray level) image processing are performed in the respective areas at image reading of the line sensor, the quality of printout can be remarkably improved.

In this case, if the binary area is recognized based on the output data of the area sensor and the line sensor reads only the image data in the multi-valued area, the readout-time is further reduced. If the printer used herein prints out a multivalued gray-level image, the quality of printout in the multivalued area can be further improved.

What is claimed is:

1. A microfilm reader, comprising:
    a two-dimensional area sensor reading a microfilm image to supply first image data;

a display displaying a display image based on the first image data;

a line sensor reading said microfilm image to supply second image data to be printed out and image processing means for:

detecting a gray-level distribution of the microfilm image by using the first image data;

separating an image area of the image into a high contrast area and a low contrast area; binarizing the second image data corresponding to the high contrast area to emphasize the binary density portion in the high contrast area; multinarizing the second image data corresponding to the low contrast area to represent a tone gradation; and combining the binarized image data of the high contrast area and the multinarized image data of the low contrast area to provide combined image data for printing.

2. The microfilm reader according to claim 1, wherein said area sensor reads a series of microfilm images of sequential frames of the microfilm while continuously feeding the microfilm, and said display shows the display images of the sequential frames as continuous images.

3. The microfilm reader according to claim 1, further comprising a printer receiving said second image data for printing.

4. The microfilm reader according to claim 3, wherein said printer is adapted to print a multinarized image data represented with halftone.

5. A microfilm reader, comprising:

a two-dimensional area sensor reading a microfilm image to supply first image data;

a display displaying a display image based on the first image data;

a line sensor reading said microfilm image to supply second image data to be printed out;

image processing means for:

detecting a gray-level distribution of the microfilm image by using the first image data, and separating an image area of the image into a high contrast area and a low contrast area; and said line sensor selecting and reading only the partial image in the low contrast area.

6. The microfilm reader according to claim 5, wherein:

said image processing means selects, as a selected first image data portion, the portion of the first image data corresponding to the high contrast area;

said image processing means combines the selected first image data portion and the second image data corresponding to the low contrast area to provide combined image data for printing.

7. The microfilm reader according to claim 5, wherein said area sensor reads a series of microfilm images of sequential frames of the microfilm while continuously feeding the microfilm, and said display shows the display images of the sequential frames as continuous images.

8. The microfilm reader according to claim 5, further comprising a printer receiving said second image data for printing.

9. The microfilm reader according to claim 8, wherein said printer is adapted to receive a multinarized image data for halftone representation.

10. The method according to claim 11, wherein said area sensor reads a series of images of sequential frames of the microfilm while continuously feeding the microfilm so that the images of sequential frames can be shown on the display as continuous images.

11. A microfilm reader control method, comprising the steps of:

a) reading a microfilm image with an area sensor to supply first image data;

b) displaying on a display a display image based on the first image data;

c) specifying a target frame from plural frames of the microfilm viewed on the display as display images;

d) reading the microfilm image of the target frame by a line sensor to output second image data; and e) printing out a print image corresponding to the microfilm image of the target frame based on the second image data;

wherein:

a gray-level distribution of the target image is detected based on the first image data to separate an image area of the image into a high contrast area and a low contrast area;

a binary image processing is performed for the portion of the second image data corresponding to the high contrast area to emphasize the binary density portion in the high contrast area, whereas a multi-valued image processing is performed for the portion of the second image data corresponding to the low contrast area to represent a tone gradation; and the binarized image data of the high contrast area and the multinarized image data of the low contrast area are combined for printing.

12. A microfilm reader control method, comprising the steps of:

a) reading a microfilm image with an area sensor to supply first image data;

b) displaying on a display a display image based on the first image data;

c) specifying a target frame from plural frames of the microfilm viewed on the display as display images;

d) reading the microfilm image of the target frame by a line sensor to output second image data; and e) printing out a print image corresponding to the microfilm image of the target frame based on the second image data;

wherein a gray-level distribution of the image of the target frame is detected based on the first image data to separate an image area of the target image into a high contrast area and a low contrast area, said line sensor selecting and reading only the partial image in the low contrast area.

13. The method according to claim 12, wherein a portion of the first image data corresponding to the high contrast area is selected as selected partial first image data; and the selected partial first image data and the second image data output from said line sensor corresponding to the low contrast area is combined to provide combined image data for printing.

14. The microfilm reader control method according to claim 12, wherein said area sensor reads a series of images of sequential frames of the microfilm while continuously feeding the microfilm so that the images of sequential frames can be shown on the display as continuous images.

* * * * *